(12) United States Patent
Anders

(10) Patent No.: US 6,299,393 B1
(45) Date of Patent: Oct. 9, 2001

(54) METHOD AND APPARATUS FOR CHIP REMOVAL

(75) Inventor: Cameron F. Anders, Webster, NY (US)

(73) Assignee: The Gleason Works, Rochester, NY (US)

( * ) Notice: Subject to any disclaimer, the term of this patent is extended or adjusted under 35 U.S.C. 154(b) by 0 days.

(21) Appl. No.: 09/483,159

(22) Filed: Jan. 14, 2000

Related U.S. Application Data

(60) Provisional application No. 60/116,158, filed on Jan. 15, 1999.

(51) Int. Cl.[7] .............................. B23Q 11/00; B23F 23/00; B23C 9/00
(52) U.S. Cl. .............................. 409/131; 409/12; 409/26; 409/137; 451/456
(58) Field of Search ..................................... 409/131, 137, 409/135, 136, 12, 26, 1; 144/252.1, 174, 176; 74/609, 608; 468/67; 451/453, 456; 82/901; 29/DIG. 61, DIG. 73, DIG. 94, DIG. 95, DIG. 99, DIG. 100, DIG. 102

(56) References Cited

U.S. PATENT DOCUMENTS

| | | | |
|---|---|---|---|
| 4,162,769 | * 7/1979 | LaPointe | 144/174 X |
| 4,247,053 | * 1/1981 | LaPointe | 144/176 X |
| 4,685,361 | * 8/1987 | Myers | 74/608 X |
| 4,981,402 | 1/1991 | Krenzer et la. | 409/26 |
| 5,586,848 | 12/1996 | Suwijn | 409/137 |
| 5,944,079 | * 8/1999 | Yamaguchi | 409/137 X |
| 5,951,219 | 9/1999 | Stadtfeld et al. | 409/131 |
| 6,135,174 | * 10/2000 | Neville | 144/174 X |

OTHER PUBLICATIONS

Ophey, Lothar, "Gear Hobbing Without Coolant", *Gear Technology*, Nov./Dec. 1994, pp. 20–24.

Phillips, Robert, "New Innovations in Hobbing—Part II", *Gear Technology*, Nov./Dec. 1994, pp. 26–30.

Stadtfeld, Hermann J., "Gleason Power–Dry–Cutting™ of Bevel and Hypoid gears", The Gleason Works, Rochester, New York, May 1997.

\* cited by examiner

*Primary Examiner*—William Briggs
(74) *Attorney, Agent, or Firm*—Robert L. McDowell

(57) ABSTRACT

Chip enclosure (150) wherein the interior portion comprises a primary suction port (152) and a secondary suction port (154). Both primary suction port and secondary suction port are connected via a short neck portion (155) to outlet (156) that is in communication with a source of vacuum. The bulk of chips formed as a result of machining are captured by the primary suction port (152) while any remaining chips fall to the lowest location of the chip enclosure (150) where they are drawn in to the secondary suction port (154).

13 Claims, 7 Drawing Sheets

METHOD AND APPARATUS FOR CHIP REMOVAL

This application claims the benefit of U.S. Provisional Application No. 60/116,158 filed Jan. 15, 1999.

FIELD OF THE INVENTION

The present invention relates to machine tools and the manner in which metal chips from machining processes are removed therefrom. Specifically, the present invention is directed to an apparatus for directing chips away from the machining area of a machine for producing toothed articles such as bevel and hypoid gears.

BACKGROUND OF THE INVENTION

Traditionally, machining of metal workpieces to produce desired articles, such as hobbing processes to produce spur and helical gears, shafts, splines, and the like, or face milling and face hobbing processes to produce bevel and hypoid gears, have been performed in the presence of a coolant medium supplied to the point of engagement of a tool and workpiece. Aside from the obvious function of cooling the tool and workpiece, coolant also reduces tool wear and serves to flush metal chips, which emanate from a machined workpiece, away from the area of engagement of tool and workpiece and out of the machine. Once flushed away from the tool and workpiece, chips may separated from the coolant by filtering or by magnetic separator means as is well known in the art.

While coolant certainly has many advantages, it also has its drawbacks. Coolant is expensive to purchase, and in some cases disposal costs are just as expensive. Coolant mist and coolant oil smoke are considered to be environmental hazards. Therefore, machines must include a mist/smoke collector as a means to remove such airborne contaminants from the atmosphere within the machine enclosure. Coolant circulation in a machine tool requires a pump and hoses to deliver coolant to the machining area, and a chip separator to remove metal chips from the coolant. Such separators are somewhat more complicated than simple powered drag lines used to convey dry chips. In some cases, filters may be needed to remove other debris from the coolant, or a coolant chiller may be required to control both the coolant and the machine equilibrium temperature.

Recently, dry machining processes such as dry hobbing of cylindrical gears and dry cutting of bevel gears have drawn attention as an alternative to processes utilizing coolant (wet machining processes). See, for example, Phillips, "New Innovations in Hobbing—Part II", *Gear Technology*, November/December 1994, pp. 26–30, and, Stadtfeld, "Gleason POWER-DRY-CUTTING™ of Bevel and Hypoid Gears", The Gleason Works, Rochester, N.Y., May 1997.

It may be seen that dry machining has the potential to overcome many serious and costly drawbacks associated with the use of a liquid coolant. Also, dry chips are normally more valuable as a recyclable material than chips which are residually wetted by a process fluid. Parts cut without coolant do not need washing, prior to further processing such as heat treatment.

However, the heat generated in dry machining processes is a contributor to tool wear and it also may have detrimental effects on the machine itself, causing differential growth of components such as spindles, bearings, or the machine frame. Much of the process heat in dry machining is removed by the chips that must be removed from the machine as quickly as possible and in a manner by which they do not contact the machine frame for any extended period of time.

One way to remove dry chips is to permit the hot chips to slide by gravity toward a chip conveyor built into the base of a hobbing machine. Such a chip removal system is shown in Ophey, "Gear Hobbing Without Coolant", *Gear Technology*, November/December 1994, pp. 20–24.

Another method of removing chips from a machine tool capable of wet and dry machining is known from U.S. Pat. No. 5,586,848 to Suwijn wherein the chips are discharged into the machine base where a reversible transfer mechanism carries them to respective wet or dry outlets.

Still another manner in which to remove chips from the machining interface and out of a machine is disclosed in commonly assigned and copending U.S. Pat. No. 5,951,219 to Stadtfeld et al. The generally circular-shaped shroud comprises a peripheral portion having a flange attached at one end thereof for securing the chip removal apparatus to a backing plate or directly to a machine tool. The other end of the peripheral portion is attached to a front portion made up of one or more sections that are arranged such that a tool and workpiece are provided appropriate space within the apparatus as is necessary to accommodate the angular separation between the tool and workpiece. The inner surface of the peripheral portion is curved, preferably circular, such that chips emanating from the tool-workpiece interface are projected toward the inner surface and travel along the curved surface into an outlet where they are conveyed away from the machine tool. The enclosure preferably further comprises means to project a gaseous stream along a portion of the inner surface of the apparatus for urging chips toward and/or into the outlet. Means to enhance air flow from the outlet may also be included.

It is an object of the present invention to provide a system to remove metal chips from a machine tool in a rapid manner such that heat from the chips is not transferred to the body of the machine tool.

It is a further object of the present invention to remove substantially all chips generated by a machining process from the machining chamber thus eliminating, or significantly reducing the frequency of, the need to manually remove chips that have escaped from the chip removal apparatus.

SUMMARY OF THE INVENTION

The present invention is directed primarily to the interior portion of the chip enclosure which comprises a primary suction port and a secondary suction port. Both primary suction port and secondary suction port are connected via a short neck portion to outlet that is in communication with a source of vacuum. The bulk of chips formed as a result of machining are captured by the primary suction port while any remaining chips fall to the lowest location of the chip enclosure where they are drawn in to the secondary suction port.

DETAILED DESCRIPTION OF THE PREFERRED EMBODIMENT

The present invention will be discussed in detail by referring to preferred embodiments and the accompanying drawings. In all drawing figures, like reference numbers refer to similar components.

Figure 1:
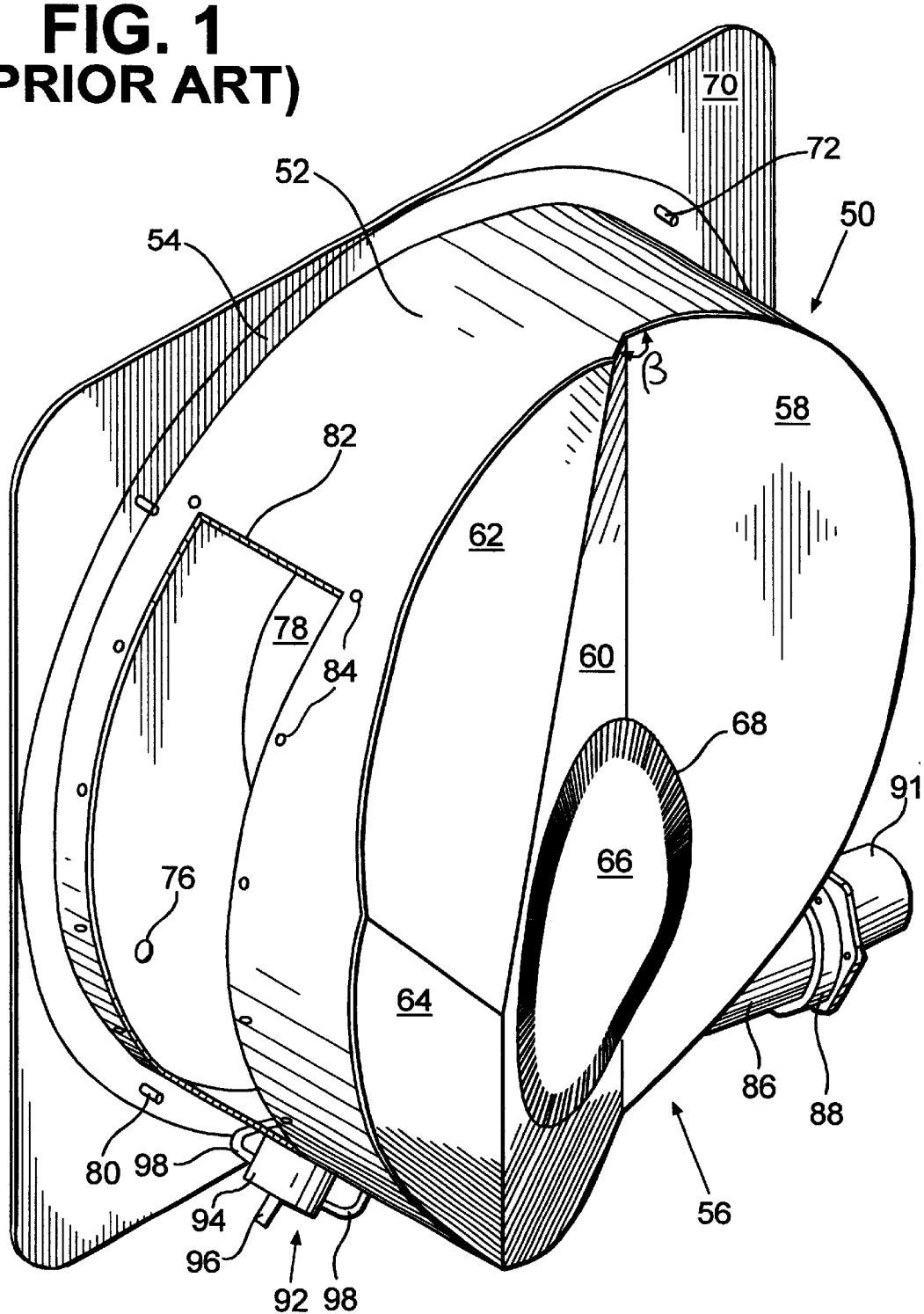
FIG. 1 is a perspective view of a prior art chip removal apparatus.

FIG. 1 illustrates a chip enclosure as shown in previously mentioned U.S. Pat. No. 5,951,219 wherein the chip removal device 50 is generally cylindrical and comprises a peripheral portion 52 having a curved, preferably circular, inner surface 53, a mounting flange 54 attached to one end of peripheral portion 52 and a front portion, designated generally by 56, located at the other end of the peripheral portion 52. Front portion 56 comprises a plurality of sections 58, 60, 62 and 64. Sections 58 and 60 are oriented at an angle β appropriate for providing the space within the apparatus necessary to accommodate the angular separation between a tool and workpiece. Sections 62 and 64 are designed to enhance the accessibility of the workpiece, for mounting and removal.

Figure 2:
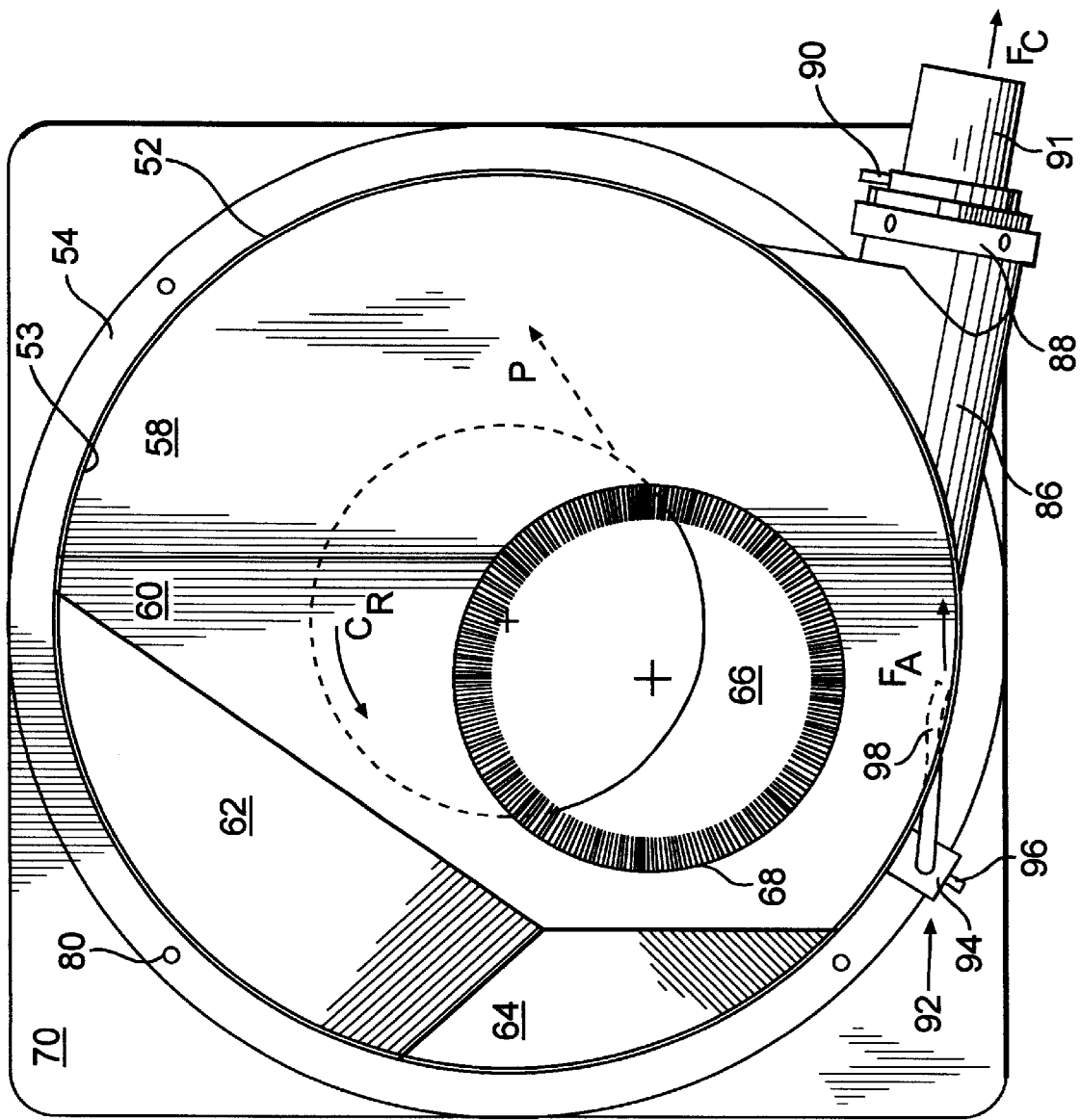
FIG. 2 shows a front view of the prior art chip removal apparatus of FIG. 1.

An opening 66 is formed in front portion 56 in order that a workpiece can be moved into and out of the chip removal apparatus 50. The opening 66 preferable includes a sealing means, such as a brush-type compliant seal 68 made of nylon, for example, to prohibit chips from escaping the apparatus 50 via the area around the workpiece spindle. The placement and size of opening 66 may vary and is dependent upon the particulars of the process utilized and the workpiece being machined as can be appreciated by the skilled artisan. For example, if there will be translational movement of a workpiece spindle during machining, such as may be involved in a generating process, hole 66 and/or seal 68 need to be sized accordingly to accommodate these dimensional requirements. In FIGS. 1 and 2, the illustrated chip removal apparatus 50 is configured for machining of a bevel ring gear.

Chip removal apparatus 50 may be secured directly to a machine tool via mounting means, such as screws, extending through flange 54. However, the preferred means for mounting apparatus 50 to a machine tool is via a backing plate 70, preferably made of sheet metal such as steel or aluminum, which in turn is mounted to a surface or component of a machine tool. A top mounting bracket 72 (FIG. 3) may be included, for example, for securing plate 70 to the top of a tool head or slide (not shown) of a gear cutting machine such as the type shown in previously mentioned U.S. Pat. No. 4,981,402. Similarly, a side mounting bracket 74 may also included to secure plate 70 to the machine, usually to the same component as top bracket 72. Alternative to, or in addition to, mounting brackets 72 and 74, backing plate 70 may be directly mounted to a machine tool surface via means such as screws extending through a plurality of holes 76 (only one shown) positioned about the surface of backing plate 70. Backing plate 70 includes access hole 78 to permit passage of a tool, such as a gear cutting tool, into chip removal apparatus 50.

In order to secure peripheral portion 52 to backing plate 70, a plurality of fastening elements 80, such as threaded studs, extend from backing plate 70 and through correspondingly positioned holes in flange 54. Once positioned in this manner, a nut or similar element is positioned on the fastening element and tightened.

The chip removal apparatus of the present invention may include an opening 82 over which a hinged door (not shown) or window (not shown) may be placed. If a window is installed, it may be secured to peripheral portion 52 such as by screws or bolts extending through holes 84.

In FIG. 2, chips emanating from a machining operation, in which a cutting tool is rotating in a counter-clockwise direction $C_R$ (when viewed in FIG. 2), are projected outward from the tool-workpiece interface along a direction P. Upon striking the curved inside surface 53 of peripheral portion 52, the momentum of the chips will cause the majority of them to travel in a counter-clockwise direction along the curved inside surface 53 and enter into outlet 86. From outlet 86, chips may be deposited directly into an appropriate receptacle or onto a chip conveyor. Usually, however, chips are transported via a conduit (not shown) of a desired type to a receptacle or conveyor.

The flow of chips from the outlet 86 may be assisted by vacuum means (not shown) at a point along the conduit to enhance chip flow through the conduit. A vacuum means also will enhance movement of the chips within the apparatus 50 toward the chip outlet 86. Alternative to a vacuum means, or in addition thereto, the chip removal apparatus 50 may further include an air flow amplifier assembly 88 (FIG. 2) at the outlet 86 to speed the flow of chips from the outlet 86. Examples of air flow amplifiers include venturis, ejectors and Coandas with preferred air flow amplifiers being the Air-Tec model AM series. Preferably, the air flow amplifier assembly 88 is supplied with compressed air at about 60–90 pounds per square inch (psi) via supply pipe 90 which results, respectively, in an output $F_C$ of 230–315 Standard Cubic Feet per Minute (SCFM) via outlet 91, which, for the Air-Tec model AM40 is 2.00 inches in diameter. With either vacuum or air flow amplifier assistance, means to slow the air flow and separate chips from the flow of air may also be included, for example, a cyclone separator or an open or closed deceleration drum system.

In the event some chips do not reach the outlet 86 but instead gather in the lower region of the peripheral portion 52 (when viewed in FIG. 2), a chip flow assist means 92 (FIGS. 1 and 2) may be included to urge chips toward and/or into outlet 86. Preferably such chip flow assist means 92 includes a distribution chamber 94, inlet 96 and one or more outlets 98 extending into the lower region of peripheral portion 52 to direct a flow of gas, preferably air, $F_A$, along the inner surface of the peripheral portion 52 to urge chips toward and/or into outlet 86 where they will come under the influence of the previously mentioned vacuum or air flow assist means. For this purpose, air pressure in the range of about 5 to about 30 pounds per square inch (psi) supplied to the distribution chamber 94 is usually sufficient. Alternative to the chip flow assist means 92 of FIGS. 1 and 2, means to provide a gaseous (preferably air) curtain or "knife" may be provided to urge chips toward and/or into outlet 86.

Of course it is to be understood that in the event of cutting tool rotation $C_R$ being clockwise (with respect to the view provided by FIG. 2), the chips would be projected such that their movement along the curved inner surface 53 of peripheral portion 52 would also be in a clockwise direction. In this instance, it can be seen that placement of the outlet 86 and the flow assist means 92 would necessarily be opposite that shown in FIG. 2.

Figure 3:
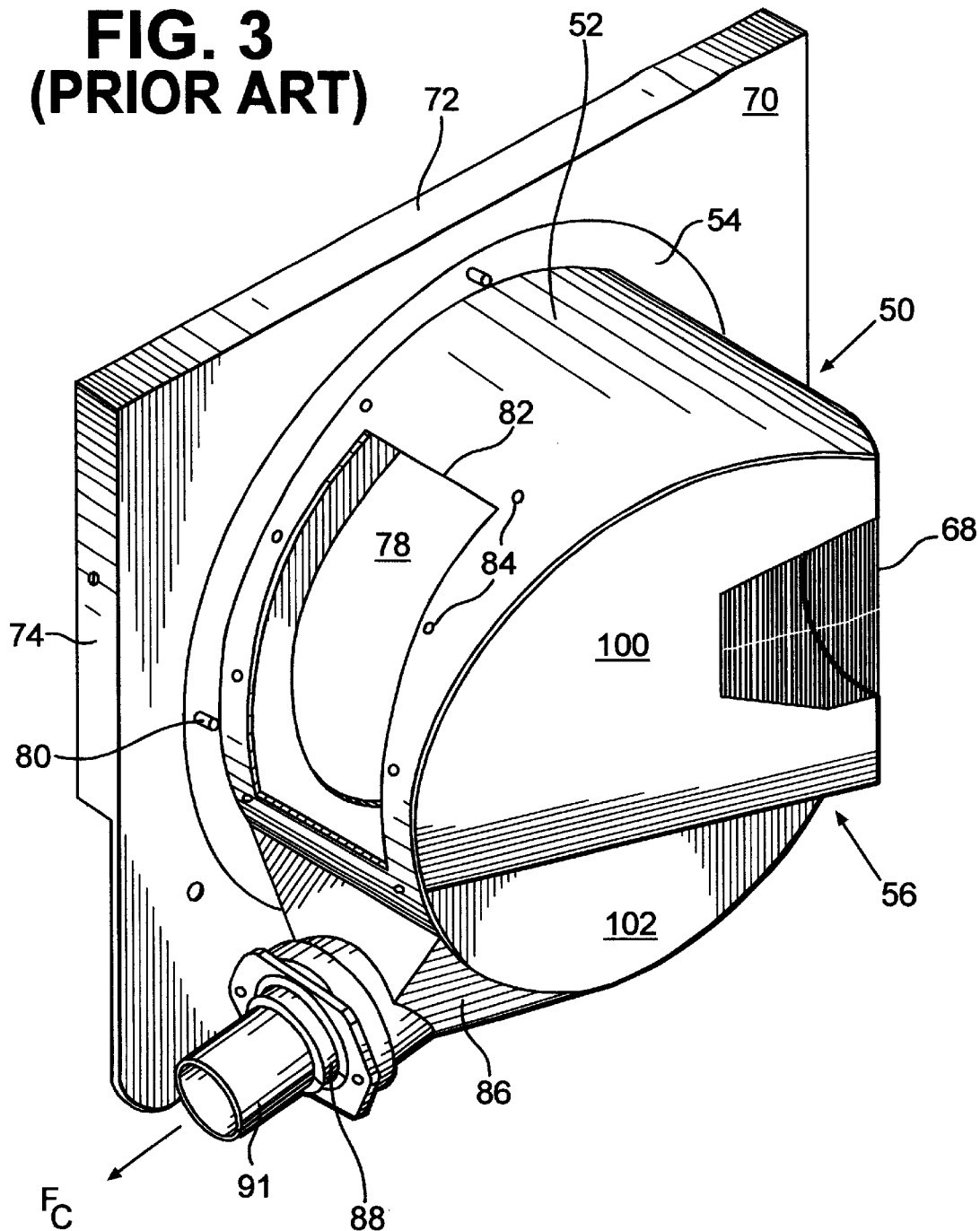
FIG. 3 shows a perspective view of an alternative embodiment prior art chip removal apparatus.
Figure 4:
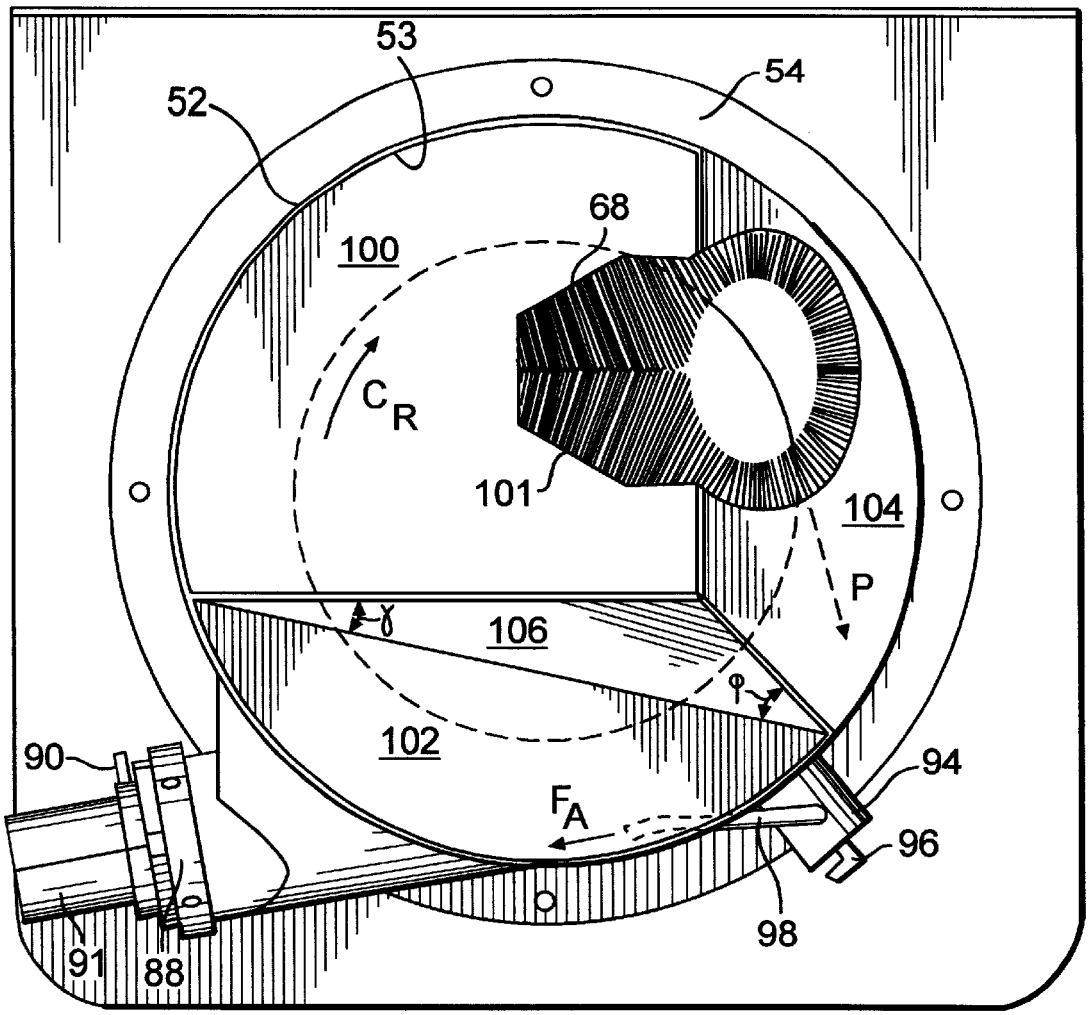
FIG. 4 illustrates a front view of the prior art apparatus of FIG. 3.

FIG. 3 also illustrates an embodiment found in U.S. Pat. No. 5,951,219 in which the front surface 56 is altered such that the chip flow apparatus 50 can accommodate a pinion being machined. Front portion 56 comprises a plurality of sections 100, 102, 104 and 106. Front portion sections 100 and 104 are oriented at respective angles γ and φ (see FIG. 4) appropriate for providing the space necessary to accommodate the angular separation between a tool and workpiece. In the case of FIGS. 3 and 4, the workpiece is a bevel pinion.

Workpiece opening 66 is located primarily in section 104 (FIG. 4) and includes compliant seal 68. A portion of section 100 also includes a cut-out portion 101 (FIG. 3) which is occupied by the brush-type compliant seal 68. The additional cut-out portion 101 is necessary to allow for movement of the pinion (i.e. generating motions) during formation of its tooth surfaces and/or to accommodate the path of movement by the pinion and its associated workholding equipment when entering and exiting the chip flow apparatus 50.

Figure 5:
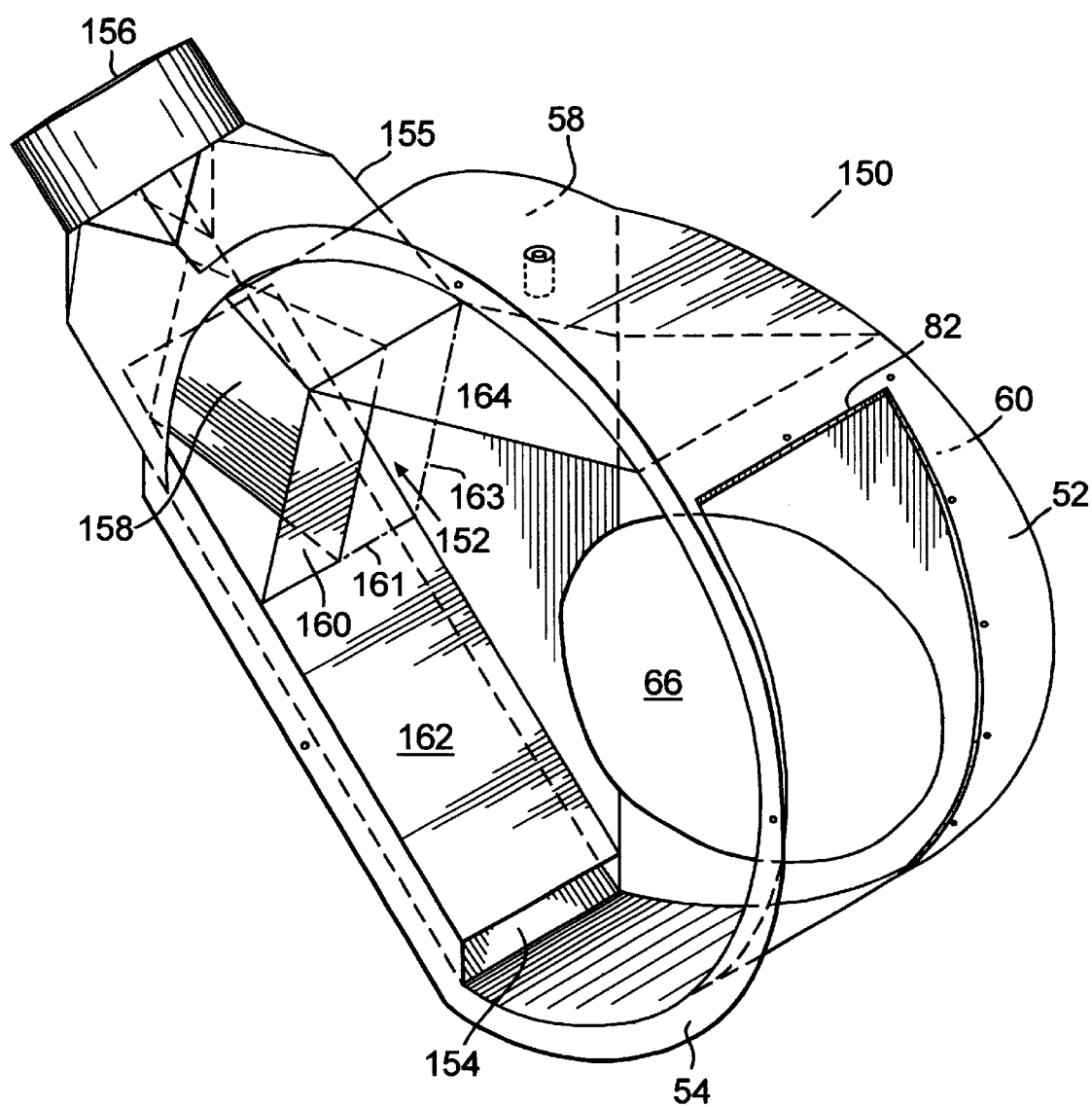
FIG. 5 illustrates a back perspective view of the chip removal apparatus of the present invention.

FIG. 5 illustrates a chip enclosure 150 in accordance with the present invention. The exterior of the chip enclosure 150 varies little from that shown in FIGS. 1 and 2 and comprises peripheral portion 52, front sections 58 and 60 (additional sections 62 and 64 may be included especially if increased access room to the machining chamber is desired), workpiece opening 66 and door or window opening 82.

The present invention is directed primarily to the interior portion of the chip enclosure 150 which comprises a primary suction port 152 and a secondary suction port 154. Both ports 152 and 154 are connected via a short neck portion 155 to outlet 156 that is in communication with a source of vacuum (not shown). Located inward of outlet 156 is an angularly extending side wall 158 and end wall 160. Side wall 158 and top surface 164 function to keep the cross-sectional area of suction port 152 about the same as the cross-sectional area of outlet 156, minus the area of the suction port 154, thus preventing loss of velocity due to a sudden "opening up" into the interior of the chip enclosure 150. The inclusion of side wall 158 and top surface 164 also enable the primary suction port 152 to be positioned in close proximity to the workpiece/tool interface while ensuring the availability of optimum vacuum at the workpiece/tool interface.

The inventive chip removal enclosure 150 is attached a machine tool with or without a backing plate as previously discussed. The chip enclosure, with or without the backing plate, may be mounted on a pivoting system to facilitate inspection and removal of a cutter head. The enclosure can be held in position by means of an over-center toggle latch instead of nuts and studs to speed the pivoting process.

Figure 6:
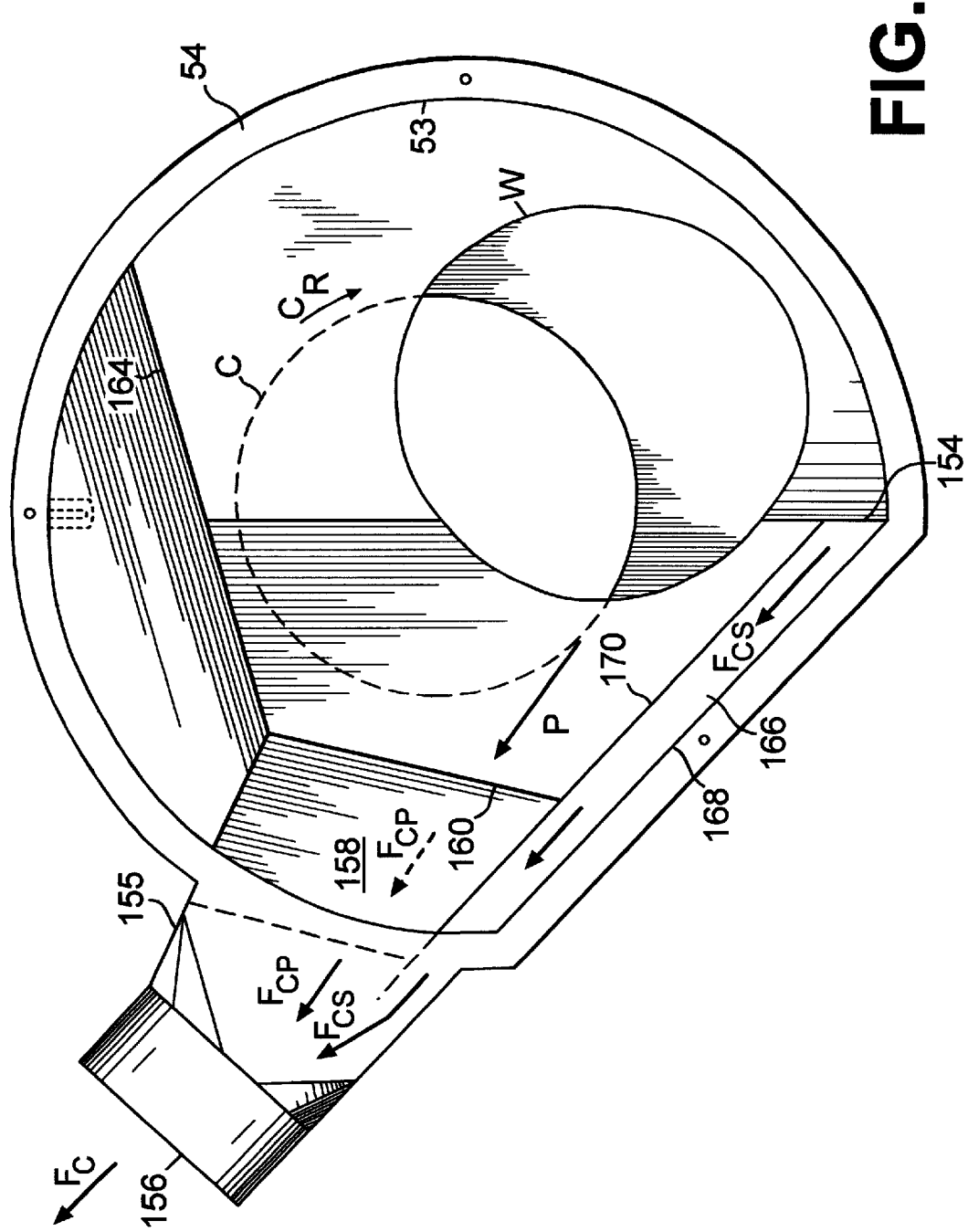
FIG. 6 illustrates a back view of the chip removal apparatus of the present invention.

Primary suction port 152 is defined between end wall 160 and front section 58 and is positioned such that chips emanating from the workpiece/tool interface are projected toward suction port 152. For illustration and explanation purposes only, primary suction port 152 is shown defined by dot-dash lines 161 and 163 which, in actuality, are not present on bottom surface 162 and front surface 58 respectively. FIG. 6 illustrates a rear view of the present invention showing the position of a tool C rotating in clockwise direction $C_R$ when cutting a workpiece in position W with the projection of chips shown by P. Preferably, chip enclosure 150 is oriented at an appropriate angle such that chips will be projected toward suction port 152. FIG. 6 illustrates such an angular orientation. With the application of vacuum at outlet port 156, substantially all chips will enter into primary suction port 152 with their flow being identified as $F_{CP}$.

Figure 7:
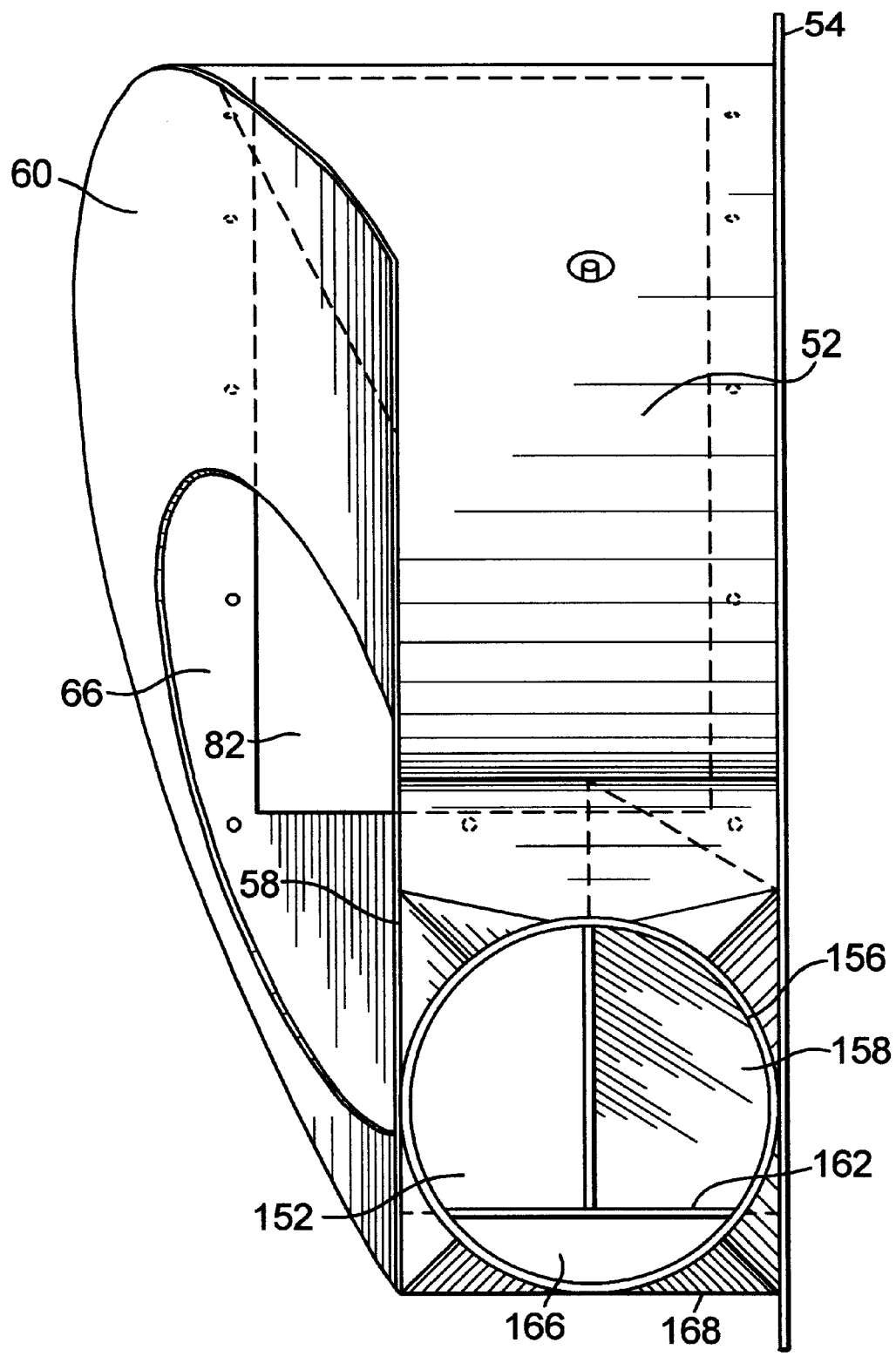
FIG. 7 is an outlet end view of the inventive apparatus.

For the small number of chips that do not enter primary suction port 152, these chips gather at the lowest point of the chip enclosure 150 and it is at that location where secondary suction port 154 is positioned. Secondary suction port 154 communicates with outlet 156 via a channel 166 defined between the lower peripheral portion 168 of chip enclosure 150 and the bottom surface 162. Any chips not entering primary suction port 152 will fall, due to the angular orientation of chip enclosure 150, toward secondary suction port 154 as can be appreciated when viewing FIG. 6. In a like manner, any chips on cutting tool C that are not projected toward primary suction port 152, will be thrown off the tool and against either top surface 164 or curved inner surface 53 which, in either instance, will result in the chips falling toward secondary suction port 154. The application of vacuum will cause chips to flow, as shown by $F_{CS}$, through channel 166 toward outlet 156. At outlet 156, (see FIG. 7 also) chip flow $F_{CP}$ from the primary suction port 152 and chip flow Fcs from the secondary suction port 154 merge and exit as a single flow $F_C$ through outlet 156.

With the present invention, there is no longer a need for brush-type seals such as shown at 68 in FIG. 1. Sufficient vacuum can be applied to the chip enclosure 150 such that chips will not escape from around a workpiece and through opening 66 since air will be drawn into the chip enclosure 150 through the available space between a workpiece and the perimeter of opening 66. For example, with an outlet 156 diameter of 6 inches (152.4 mm), a 2 or 3 horsepower vacuum motor is sufficient to prevent chips from escaping through opening 66. A motor in this size range provides an airflow velocity of about 4500 feet per minute and a volume flow of about 1000 cubic feet per minute. With an 8-inch (203.2 mm) outlet diameter, a 4 or 5 horsepower vacuum motor would be sufficient.

An additional benefit of the present invention is that air drawn into the chip enclosure 150 and around a workpiece reduces the temperature of the workpiece and tool which is especially important in dry cutting processes.

The outlet 156 of chip enclosure 150 is connected, via appropriate tubing, with a vacuum system of a sufficient size as is discussed above. Additionally, a chip separator may be included to remove chips from the air flow. For example, a cyclone separator, media filter, or magnetic separator may be utilized. If a cyclone is used, a rotary air lock may be included to prevent air from entering the cyclone while allowing chips to be gathered and periodically dumped into a hopper. Air filters (e.g. bag filters) may also be included to remove small chips and metal dust from the air flow.

While the present inventive chip enclosure 150 has been discussed and illustrated based on cutting bevel ring gears, the inventive chip removal concept applies equally to chip enclosures adapted for cutting bevel or hypoid pinions (i.e. of the general type shown in FIGS. 3 and 4).

It should be clearly understood that the arrangement and even the number of the sections comprising the front portion 56 in the present invention may vary depending upon the type of gear being machined, the particular process being carried out, and/or the path required in order to move the workpiece into or out of the chip flow apparatus 50.

While the present invention has been discussed and illustrated from the perspective of a tool extending through opening 78 and a workpiece being inserted and withdrawn through opening 66, the invention is not to be limited in this manner. The principles of the present invention apply equally to arrangements where a workpiece would extend through opening 78 and a tool inserted and withdrawn through opening 66.

The chip enclosure of the present invention is particularly advantageous in dry machining processes for producing gears such as cutting bevel ring gears and pinions, preferably with carbide or coated steel tooling, by face milling or face hobbing methods.

The present invention enables chips emanating from a machining process to be contained and quickly conveyed out of a machine tool. By restricting the area in which the chips may travel, exposure of sensitive surfaces of the machine tool to chips is prevented as is the flow of process heat from the chips to machine components thus reducing the possibility of dimensional changes due to heating. Also with the present invention, the need for some guarding mechanisms on the machine tool is greatly reduced since the flow of chips is contained within the chip removal apparatus.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. An apparatus for directing chips emanating from a workpiece being machined by a tool toward, or toward and into, an outlet spaced from said workpiece, said apparatus comprising:

an enclosure for surrounding said workpiece and tool for confining said chips emanating from said workpiece to said enclosure for removal via said outlet, said enclosure comprising a primary port and a secondary port each communicating with said outlet, said primary port being positioned whereby chips emanating from a machining process are projected toward, or toward and into, said primary port, and whereby chips not entering said primary port are guided toward, or toward and into, said secondary port.

2. The apparatus of claim 1 wherein said enclosure comprises:

a peripheral portion having an inner surface at least a portion of which is curved, and first and second ends, said first end being positionable adjacent a machine tool and about one of a tool or workpiece, said second end having a front portion attached thereto, said front portion comprising at least one section arranged in a predetermined manner for providing space within said enclosure necessary to accommodate an angular separation between said tool and workpiece, said front portion including an opening through which the other of said tool or workpiece is movable into and out of said enclosure, whereby a majority of chips emanating from said workpiece during machining are projected toward, or toward and into, said primary port and any remaining chips are guided toward, or toward and into, said secondary port.

3. The apparatus of claim 1 further including a source of vacuum connected to said outlet.

4. The apparatus of claim 1 wherein said primary port and said secondary port each communicate with said outlet.

5. The apparatus of claim 4 further including a source of vacuum connected to said outlet.

6. The apparatus of claim 1 wherein said secondary port is located at a lowest point of said apparatus.

7. An apparatus for directing chips emanating from a workpiece being machined by a tool toward an outlet spaced from said workpiece, said apparatus comprising:

an enclosure for surrounding said workpiece and tool for confining said chips emanating from said workpiece to said enclosure and directing said chips to said outlet for removal from said enclosure, said enclosure comprising a peripheral portion having an inner surface at least a portion of which is curved, first and second ends, and said outlet, said first end being positionable adjacent a machine tool and about one of a tool or workpiece, said second end having a front portion attached thereto, said front portion comprising at least one section arranged in a predetermined manner for providing space within said enclosure necessary to accommodate an angular separation between said tool and workpiece, said front portion including an opening through which the other of said tool or workpiece is movable into and out of said enclosure, whereby a majority of chips emanating from said workpiece during machining are projected toward, or toward and into, a primary port and any remaining chips are guided toward, or toward and into, a secondary port located at a lowest point of said apparatus, each of said primary port and said secondary port communicating with said outlet, and, a source of vacuum communicating with said outlet.

8. A method of directing chips emanating from a workpiece being machined by a tool away from said workpiece, said method comprising:

providing an enclosure surrounding said workpiece and tool for confining said chips emanating from said workpiece to said enclosure for removal via an outlet, said enclosure comprising a peripheral portion having an inner surface, first and second ends, and said outlet, said enclosure further comprising a primary chip removal port and a secondary chip removal port each of which is in communication with said outlet, said first end being positionable adjacent a machine tool and about one of a tool or workpiece, said second end having a front portion attached thereto, said front portion comprising at least one section arranged in a predetermined manner for providing space within said enclosure necessary to accommodate an angular separation between said tool and workpiece, said front portion including an opening through which the other of said tool or workpiece is movable into and out of said enclosure, machining said workpiece with said tool, a majority of chips emanating from said workpiece being projected toward, or toward and into, said primary port and any remaining chips being guided toward, or toward and into, said secondary port, said majority of chips and said any remaining chips passing through their respective ports to said outlet.

9. The method of claim 8 further comprising:

providing a source of vacuum communicating with said outlet.

10. The method of claim 8 wherein said machining is a dry machining process.

11. The method of claim 10 wherein said source of vacuum provides a current of air entering said apparatus through said opening thereby effecting cooling of said workpiece and tool.

12. The method of claim 10 wherein said dry machining process comprises machining bevel gears.

13. The method of claim 8 wherein said tool comprises carbide.

* * * * *